United States Patent [19]

Fulhorst

[11] Patent Number: 4,523,178

[45] Date of Patent: Jun. 11, 1985

[54] WIRELESS ALARM SYSTEM IN CONJUNCTION WITH AT LEAST ONE VEHICLE

[76] Inventor: George E. Fulhorst, 2842 Forbes Ave., Santa Clara, Calif. 95051

[21] Appl. No.: 351,200

[22] Filed: Feb. 22, 1982

[51] Int. Cl.[3] .......................... G08B 13/08; B60R 25/04

[52] U.S. Cl. .......................................... 340/64; 340/63; 340/539

[58] Field of Search ............................ 340/539, 64, 63

[56] References Cited

U.S. PATENT DOCUMENTS

| | | | |
|---|---|---|---|
| 2,766,358 | 10/1956 | Davidson | 200/168 |
| 3,440,635 | 4/1969 | Hull | 340/539 |
| 3,588,858 | 6/1971 | Demuth | 340/539 |
| 3,646,515 | 2/1972 | Vodehnal | 340/64 |
| 3,703,714 | 11/1972 | Andrews | 340/64 |
| 3,795,896 | 3/1974 | Isaacs | 340/539 |
| 3,825,833 | 7/1974 | Bogue et al. | 325/119 |
| 3,914,692 | 10/1975 | Seaborn, Jr. | 325/53 |
| 3,988,724 | 10/1976 | Anderson | 340/539 |
| 4,063,410 | 12/1977 | Welling | 58/38 |
| 4,095,211 | 6/1978 | Shaughnessy | 340/539 |
| 4,143,368 | 3/1979 | Route et al. | 340/63 |
| 4,149,163 | 4/1979 | Fathauer | 340/539 |
| 4,151,514 | 4/1979 | Haynes | 340/384 E |
| 4,157,540 | 6/1979 | Oros | 340/539 |
| 4,159,467 | 6/1979 | Ballin | 340/64 |
| 4,162,449 | 7/1979 | Bouyssounnouse et al. | 325/55 |
| 4,189,721 | 2/1980 | Doell | 340/539 |
| 4,191,948 | 3/1980 | Stockdale | 340/539 |
| 4,232,308 | 11/1980 | Lee et al. | 340/539 |

OTHER PUBLICATIONS

Pulsafe by TMX (4 Sheets).

*Primary Examiner*—Glen R. Swann, III
*Attorney, Agent, or Firm*—Jack M. Wiseman

[57] ABSTRACT

An operator carries a portable transmitter when away from a parked vehicle. In the event of an emergency condition, the operator manually activates the portable transmitter to transmit within a prescribed area a coded signal. Vehicles located within the prescribed area have receivers installed therein. When the receivers detect the coded signal transmitted by the portable transmitter, the receivers are activated to operate vehicle devices, such as horns, in the associated vehicles to indicate an alarm condition. The ignition system of each vehicle is enabled for operation by the insertion of a transmitter in a receptacle associated with the ignition system. The removal of the transmitter from the associated receptacle disables the associated ignition system. The placement of the transmitter in a receptacle disables the transmitter and the removal of the transmitter from the associated receptacle enables the transmitter.

5 Claims, 6 Drawing Figures

WIRELESS ALARM SYSTEM IN CONJUNCTION WITH AT LEAST ONE VEHICLE

BACKGROUND OF THE INVENTION

The present invention relates in general to alarm systems, and more particularly to a wireless alarm system employing at least one vehicle.

Heretofore, vehicles included accessories for operating an alarm when intruders entered a vehicle or moved a vehicle. Such accessories, however, were not intended to provide an environment for the safety of an individual.

PULSAFE vehicle alarm system by TMX Systems, Inc. included a portable transmitter for arming and disarming the vehicle alarm, while an operator is away from a vehicle. When the alarm is armed and a vehicle theft is attempted, the alarm operates a horn, activates the lights and disables the engine to deter the auto theft. The vehicle alarm is also provided with an interior switch to activate the alarm in the event the occupants of the vehicle sense the need for an alert alarm.

The patent to Hull, U.S. Pat. No. 3,440,635, issued on Apr. 22, 1969, for Police Alarm discloses an alarm system in which a transmitter is operated to indicate the presence of an emergency condition. The transmitted signal is in code and is received by a plurality of receivers. The receivers upon detecting the coded signal operate respective direction finders. A tone code detector is employed for identification purposes.

In the patent to Isaacs, U.S. Pat. No. 3,795,896, issued on Mar. 5, 1974, for a Wireless Alarm System, there is disclosed a wireless alarm system which includes a transmitter and a receiver. The transmitter may be a portable transmitter. A receiver includes a decoder to provide a signal for operating the receiver. An alarm is connected to the receiver and it is activated in response to an alarm signal.

In the patent to Shaughnessy, U.S. Pat. No. 4,095,211, issued on June 13, 1978, for Electronic Security System, there is disclosed an alarm system with a plurality of transmitters emitting coded signals during an emergency condition. A remotely located receiver decodes the coded signals of the transmitters to operate a horn and to illuminate a light. The operation of the horn and the illumination of the light occurs when two or more transmitted signals have been verified.

The patent to Ballin, U.S. Pat. No. 4,159,467, issued on June 26, 1978, for an Electronic Key For A Motor Vehicle discloses a hand held portable transmitter which functions as an electronic key for a vehicle. Control over the operation of the vehicle is through detection of electromagnetic waves by a receiver installed in the vehicle.

The patent to Lee et al., U.S. Pat. No. 4,232,308, issued Nov. 4, 1980, for Wireless Alarm System discloses a receiver for the activation of an alarm for a predetermined time period.

In the patent to Davidson, U.S. Pat. No. 2,766,358, issued on Oct. 9, 1956, for Hold-Up Alarm Signal System, there is disclosed a portable transmitter. Upon activation of the transmitter, the transmitted signal is detected by a receiver. The detection of the transmitted signal by the receiver activates an alarm. The patent of Willing, U.S. Pat. No. 4,063,410, issued on Dec. 20, 1977, for Digital Watch Including A Signal Transmitter discloses a digital wristwatch. The switch on the wristwatch is actuated to transmit a signal. A receiver detecting the transmitted signal is activated to operate an alarm.

The patent to Stockdale, U.S. Pat. No. 4,191,948, issued on Mar. 4, 1980, for Digital Transmission Apparatus Particularly Adapted For Security Systems discloses a digital transmission system. The digital transmission system includes a transmitter and a receiver. The transmitter is activated during an alert state to transmit a digital code with the address and the status. A receiver detects the digital code. If the code is verified, the receiver monitors the status and address of the transmitted signal.

SUMMARY OF THE INVENTION

An alarm system comprises a portable transmitter. The portable transmitter, when activated, transmits a coded signal within a prescribed area. Receivers are mounted, respectively, in vehicles located within the prescribed area. The receivers detect the coded signal and are activated to operate vehicle devices, such as the horns, to produce an alarm condition.

An alarm system comprises a portable transmitter. The portable transmitter, when activated, transmits a signal in code. A receiver mounted in a vehicle detects the signal in code and is activated to operate a vehicle device, such as a horn, to indicate an alarm condition.

A feature of the present invention is the enabling of an ignition system of a vehicle by the insertion of a portable transmitter in a receptacle associated with the ignition system and the disabling of the associated ignition system of the vehicle by the removal of the portable transmitter from the receptacle associated with the ignition system.

Another feature of the present invention is the enabling of a portable transmitter by the removal of the portable transmitter from a receptacle associated with the ignition system of a vehicle and the disabling of the portable transmitter by the insertion of the portable transmitter into the receptacle associated with the ignition system.

Another feature of the present invention is the mounting of an alarm receiver in a vehicle that is a single use alarm. When the receiver is in an alarm operating state, it is reset to its initial state by the start-up and shut-down cycle of a vehicle ignition system.

DESCRIPTION OF THE PREFERRED EMBODIMENTS

Figure 1:
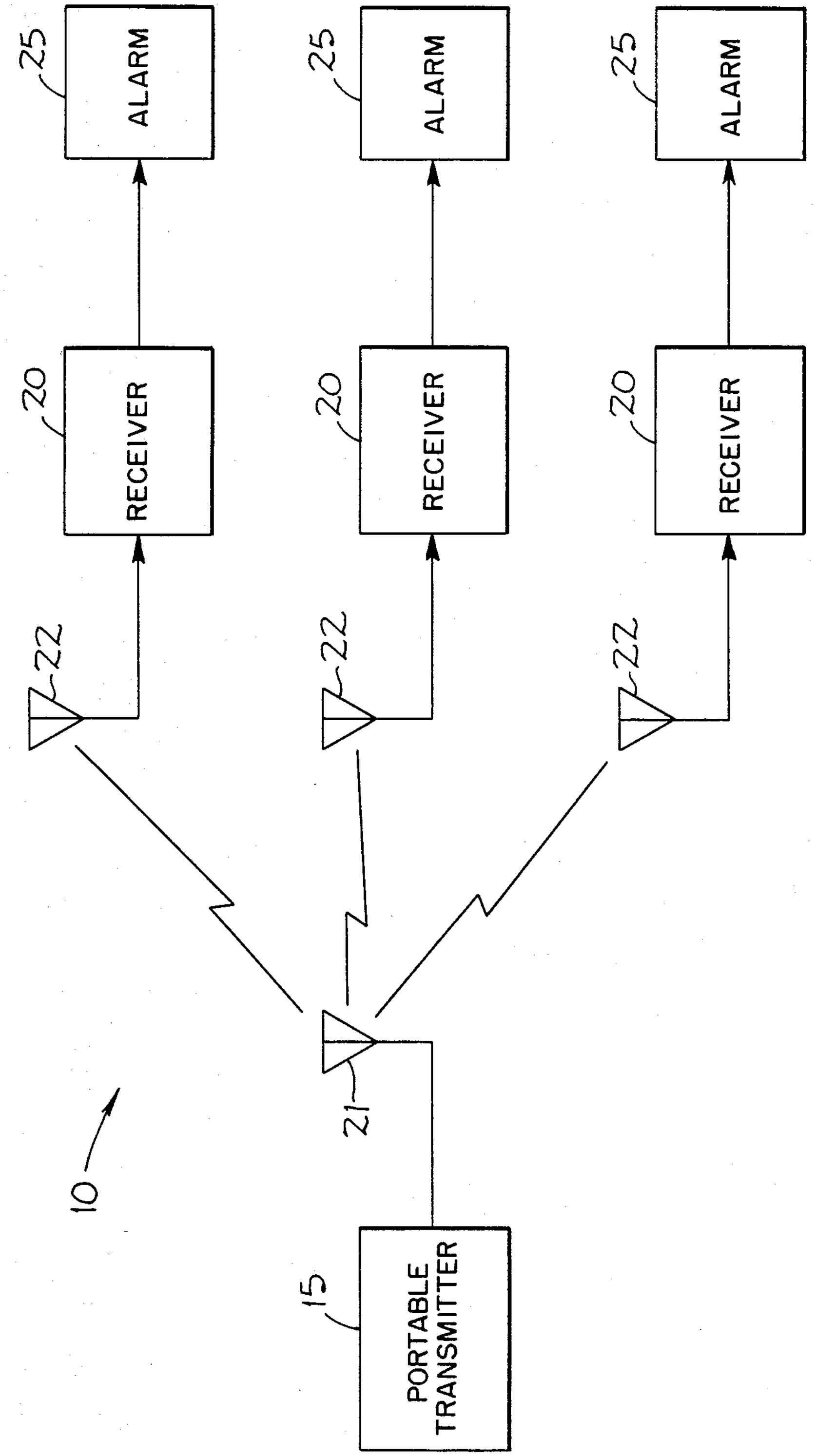
FIG. 1 is a block diagram of a portable transmitter and a plurality of receivers with associated vehicle devices operative to produce an alarm condition embodying the wireless system of the present invention.

Illustrated in FIG. 1 is the wireless alarm system 10 embodying the present invention. The wireless alarm system 10 comprises a portable transmitter 15 and a plurality of receivers 20. The portable transmitter 15 is activated manually by an operator and transmits through an antenna 21 a signal in tone code. In the exemplary embodiment, the power output of the transmitter 15 is sufficient to transmit a signal within a radius of 100 feet.

The receivers 20 are mounted in a plurality of vehicles, respectively. The vehicles are located within the prescribed distance for the receivers 20 to detect the signal transmitted by the transmitter 15. The receivers 20 detect the signal in tone code respectively from the transmitter 15 through antennas 22 and decode the signal. If the code is verified, the receivers 20 activate vehicle devices 25, respectively, to produce an alarm condition. The vehicle devices 25 include the respective horns of the vehicles in which the receivers 20 are mounted or in the alternative the headlamps of the vehicles in which the receivers 20 are mounted.

It is contemplated that one of the vehicles in which a receiver 20 is mounted is used by the operator of the transmitter 15 so that the transmitter 15 can be used to operate the horns of the vehicle used by the operator or in the alternative illuminate the headlamps of the vehicle used by the operator. While the disclosure herein shows the operation of vehicle horns, in the exemplary embodiment, it is apparent to one skilled in the art that the concept herein disclosed is also applicable to the illumination of vehicle headlamps.

Figure 2:
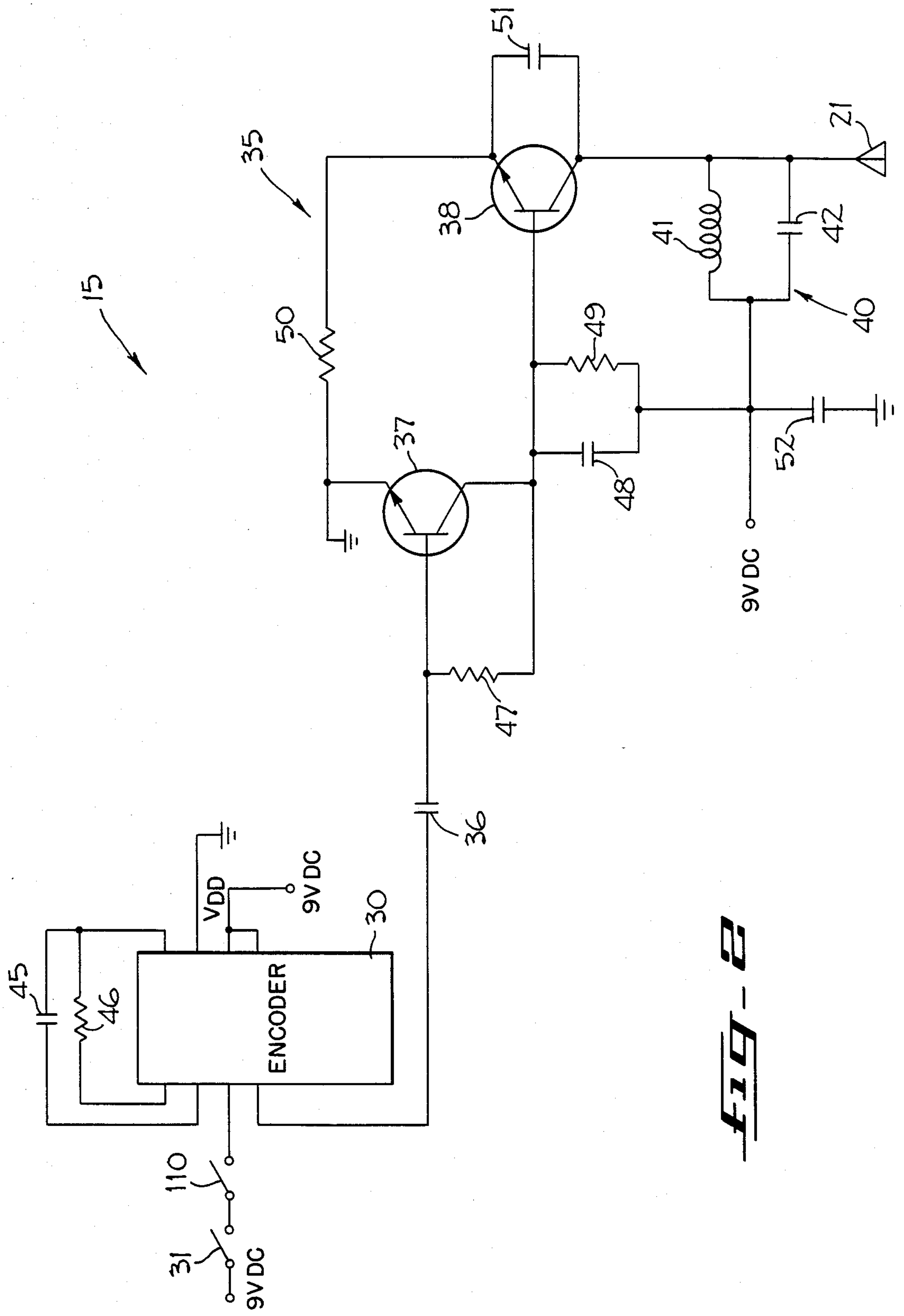
FIG. 2 is a schematic diagram of the portable transmitter employed in the wireles alarm system of the present invention

Illustrated in FIG. 2 is the portable transmitter 15 of the present invention, which is a self-contained, portable unit capable of being carried on the person of the operator. The transmitter 15 comprises a suitable battery, not shown, such as a 9 volt battery. For producing a preselected code, the transmitter 15 includes a suitable encoder, such as an ED-9 encoder manufactured by Supertex Incorporated of Sunnyvale, Calif. A normally opened manually activated switch 31 interconnects the battery of the transmitter 15 with the encoder 30. When the switch 31 is closed, a positive battery voltage is applied to the encoder 30 through the switch 31 to activate the encoder 30 to produce a tone code signal in its output. When the switch 31 is opened, the encoder 30 does not produce a tone code signal.

The tone code signal produced by the encoder 30 is applied to a suitable oscillator 35, such as a Colpitts oscillator, through a capacitor 36 and a load resistor 47. The oscillator comprises suitable transistor amplifiers 37 and 38 employing 2N2222 transistors. A feedback network including a feedback resistor 50 interconnects the transistor amplifiers 37 and 38. A bias network for the oscillator 35 includes a capacitor 48 and a resistor 49. A capacitor 51 interconnects the emitter and collector of the transistor 38 for noise suppression. The oscillator 35 includes an output resonant circuit 40 having an inductance 41 and a capacitor 42. A voltage surge suppression circuit having a capacitor 52 is connected to the output resonant circuit 40. A tone coded frequency modulated signal is transmitted from the antenna 21. The tone code is produced by the encoder 30. In the exemplary embodiment, the carrier frequency transmitted by the transmitter 15 is 80-120 megahertz and is frequency modulated by the output of the encoder 30 to produce a tone coded frequency modulated signal. While the exemplary embodiment of the present invention discloses a tone code, it is apparent that other code forms may be employed.

Each receiver 20 (FIG. 3) includes its associated antenna 22. The receiver 20, which has its own battery for power supply, is mounted, preferably, under the dashboard of a vehicle. The output of the antenna 22 is coupled to a suitable detector 60 through an r.f. transformer 61. The feed line of the antenna 22, in the exemplary embodiment, is 300 ohms for impedance matching. The r.f. transformer 61 includes a primary winding 61a and secondary windings 61b and 61c. The primary winding 61a is in the feed line circuit of the antenna 22 and the secondary windings 61b and 61c are in the detector circuit 60 and are connected to a tunnel diode 65 of the detector 60.

The resulting tone code signal from the detector 60 is applied to an inverter circuit 75 via a capacitor 76 of the detector circuit 60 and a resistor 77 and a capacitor 78 of the inverter circuit 75. In turn, the inverter circuit 75 applies the tone code signal to an amplifier circuit 80, which includes a 2N2222 transistor 81. The amplified tone signal is applied to a suitable decoder 85 such as ED-9 decoder manufactured by Supertex Incorporated of Sunnyvale, Calif.

The output of the amplifier circuit 80 is also applied to a band pass filter 70 through a rectifier 82. The band pass filter 70, in the preferred embodiment, passes 10K hertz tone signals, and includes a rectifier 71, a variable capacitor 72, a capacitor 73 and a resistor 74. The tone signals passed by the band pass filter 70 are applied to the tunnel ciode 65 through the secondary winding 61b. Through this arrangement, there is noise suppression or the noise is filtered out.

When the amplified tone code signals applied to the decoder 85 are the correct tone signal, a logic 1 signal is applied to a suitable timer circuit 90 over a conductor 91. The timer circuit 90, in the exemplary embodiment, is an LM555C timer manufactured by National Semiconductor Corp. of Santa Clara, Calif. The applied logic signal triggers the timer circuit 90. The activation of the timer circuit 90 causes the energization of a relay 95. The energization of the relay 95 results in its contacts 96 closing. When the contacts 96 close, the associated vehicle device 25 is operated, such as the operation of a horn or the illumination of vehicle headlamps, to produce an alarm condition. The timer 90, in the exemplary embodiment, is reset automatically after 55 seconds to deenergize the relay 95, which, in turn, opens contacts 96 to interrupt or discontinue the operation of the vehicle device 25. The timer 90 is also reset to its initial state by stepping the auto ignition system through its start-up and shut-down sequence in a manner to be described hereinafter. When the timer 90 is reset, the relay 95 is deenergized. Thereupon, the contacts 96 open to deactivate the vehicle device 25.

Figure 4:
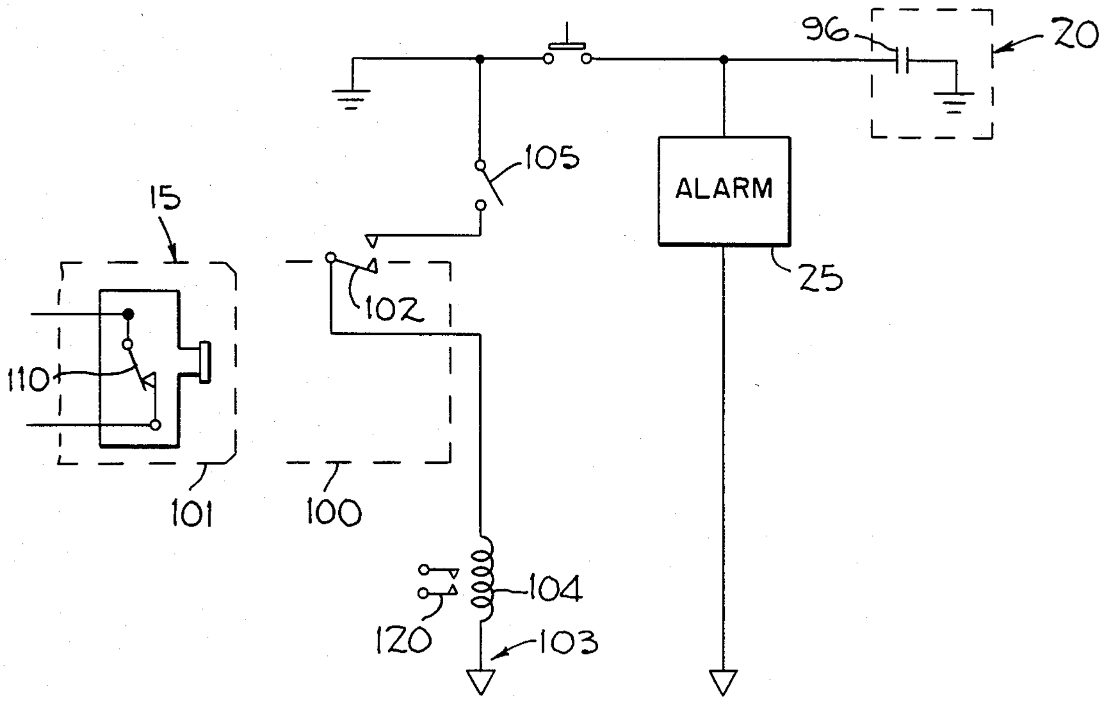
FIG. 4 is a diagrammatic illustration of a vehicle ignition system, receptacle associated with the ignition system, a vehicle device operative to produce an alarm condition nd the portable transmitter shown in FIG. 2.

Mounted under the dashboard of the vehicle is a receptacle 100 (FIGS. 4 and 5) in which the housing 101 of the transmitter 15 is removably disposed. When the transmitter 15 is inserted into the receptacle 100, the housing 101 of the transmitter 15 engages a movable, leaf spring contact of a switch 102 to close the same. The switch 102 is in an ignition circuit 103 in series with a starter coil 104 and an ignition switch 105. The closing of the switch 102 enables the operation of the ignition circuit 103. When the transmitter housing 101 is removed from the receptacle 100, the switch 102 opens under the yieldable action of its movable, leaf spring contact. This action disables the ignition circuit 103.

Figure 5:
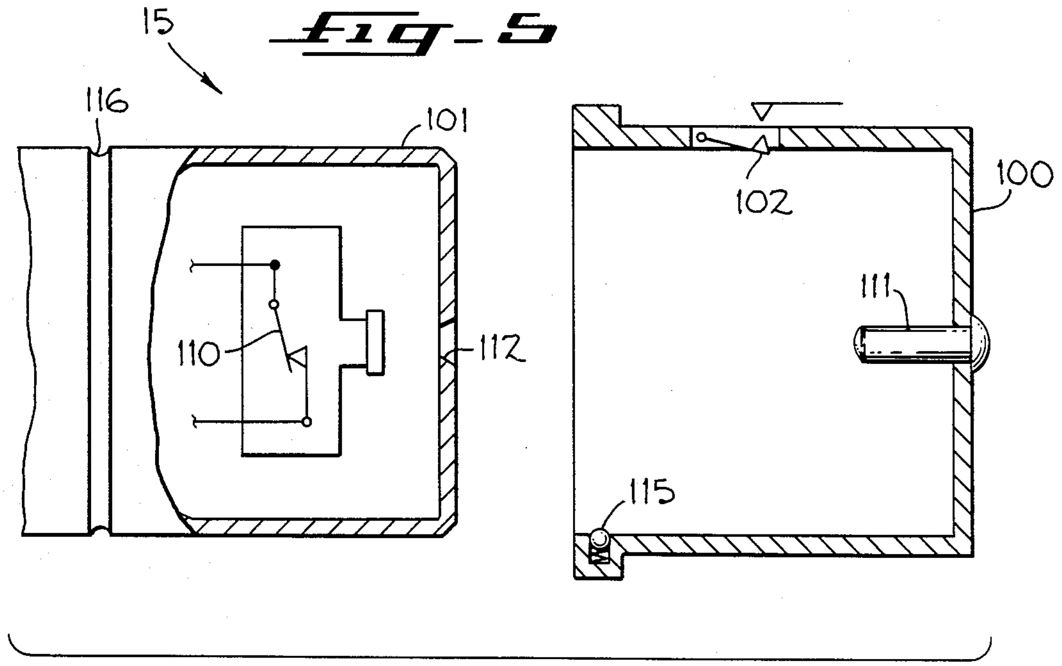
FIG. 5 is a diagrammatic elevation view of the portable transmitter and the receptacle associated with the vehicle ignition system.

Mounted in the transmitter housing 101 and connected to the voltage supply in series with the manually operated switch 31 is a switch 110 (FIGS. 2 and 5). The switch 110 includes a movable, leaf spring contact. Mounted in the receptacle 100 is a switch actuator 111. When the transmitter housing 101 is removed from the receptacle 100, the switch 110 is closed to enable the operation of the transmitter 15. When the transmitter housing 101 is inserted in the receptacle 100, the actuator 111 advances through an opening 112 in a wall of the transmitter housing 101 to engage the movable, leaf spring contact of the switch 110 to open the same. This action disables the operation of the transmitter 15. The electrical switch 110 closes when the transmitter housing 101 is removed from the receptacle 100 under the yieldable action of the leaf spring thereof.

For retaining the transmitter housing 101 in the receptacle 100 until removed therefrom under the action of an operator, the receptacle 100 includes a spring loaded ball type detent 115. The detent 115 is disposed in a bezel-collar member surrounding an open wall of the receptacle 100. A groove 116 is formed in the outer wall of the transmitter housing 101. When the transmitter housing 101 is inserted into the receptacle 100, the detent 115 is removably received in the groove 116 for retaining the transmitter housing 101 in mating relation with the receptacle 100. By urging the transmitter housing 101 outwardly from the receptacle 100, the detent 115 under its yieldable action is removable from the groove 116 to remove the transmitter housing 101 from the receptacle 100.

When the ignition system of the vehicle is stepped through its start-up and shut-down sequence within 55 seconds of the operation of the alarm 25, the starter relay 104 is energized and then deenergized. At the time the starter coil 104 completes its start-up and shut-down cycle, its contacts 120 (FIG. 4) close and open. The closing of the contacts 120 applies a ground to the reset terminals 4 and 8 of the timer 90. This action resets the timer 90 to its initial state to deenergize the relay 95. Thereupon, the contacts 96 open to deactivate the vehicle device 25. The contacts 120 are opened to assume their initial position.

Figure 3:
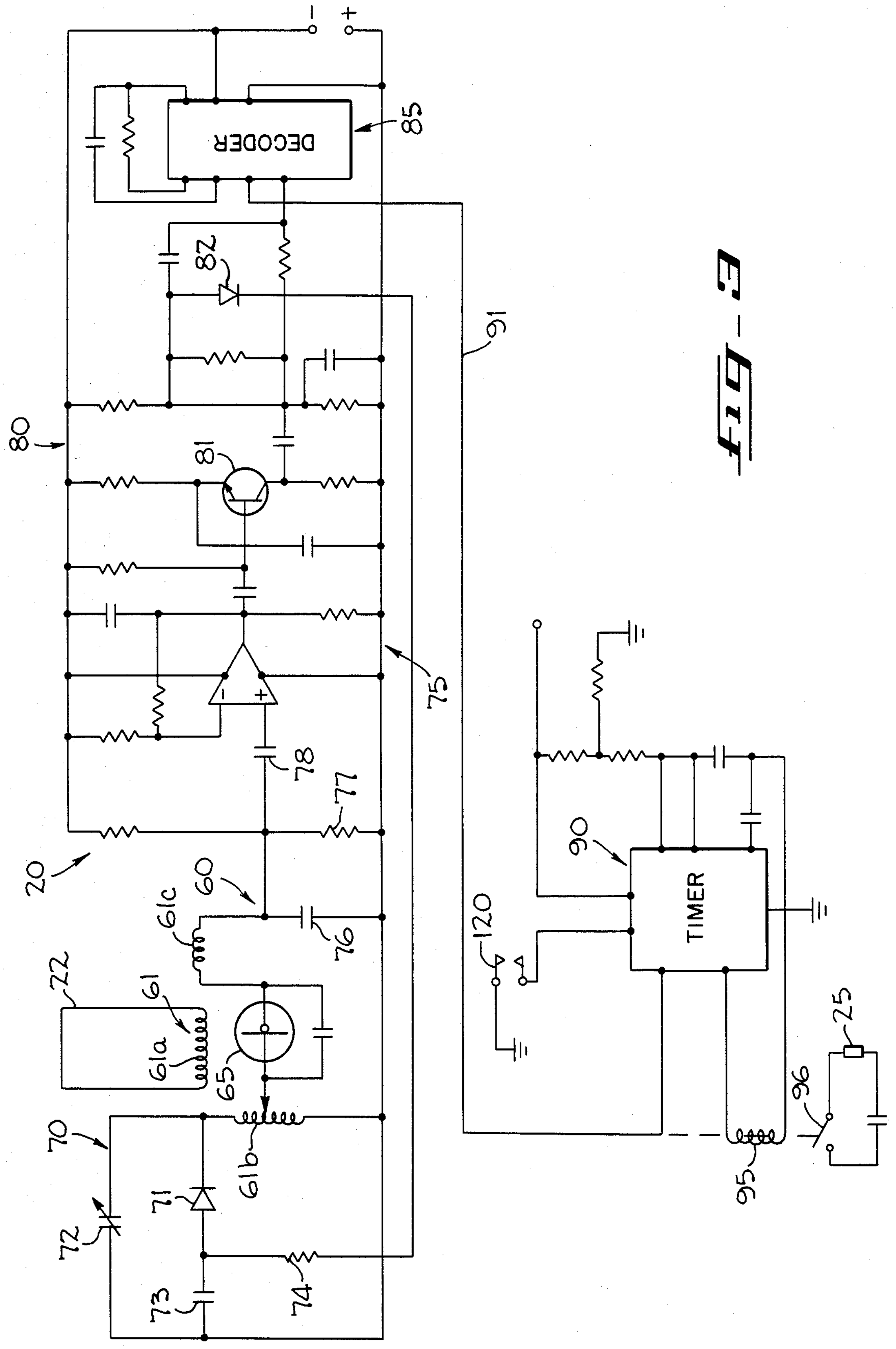
FIG. 3 is a schematic diagram of a receiver employed in the wireless alarm system of the present invention.
Figure 6:
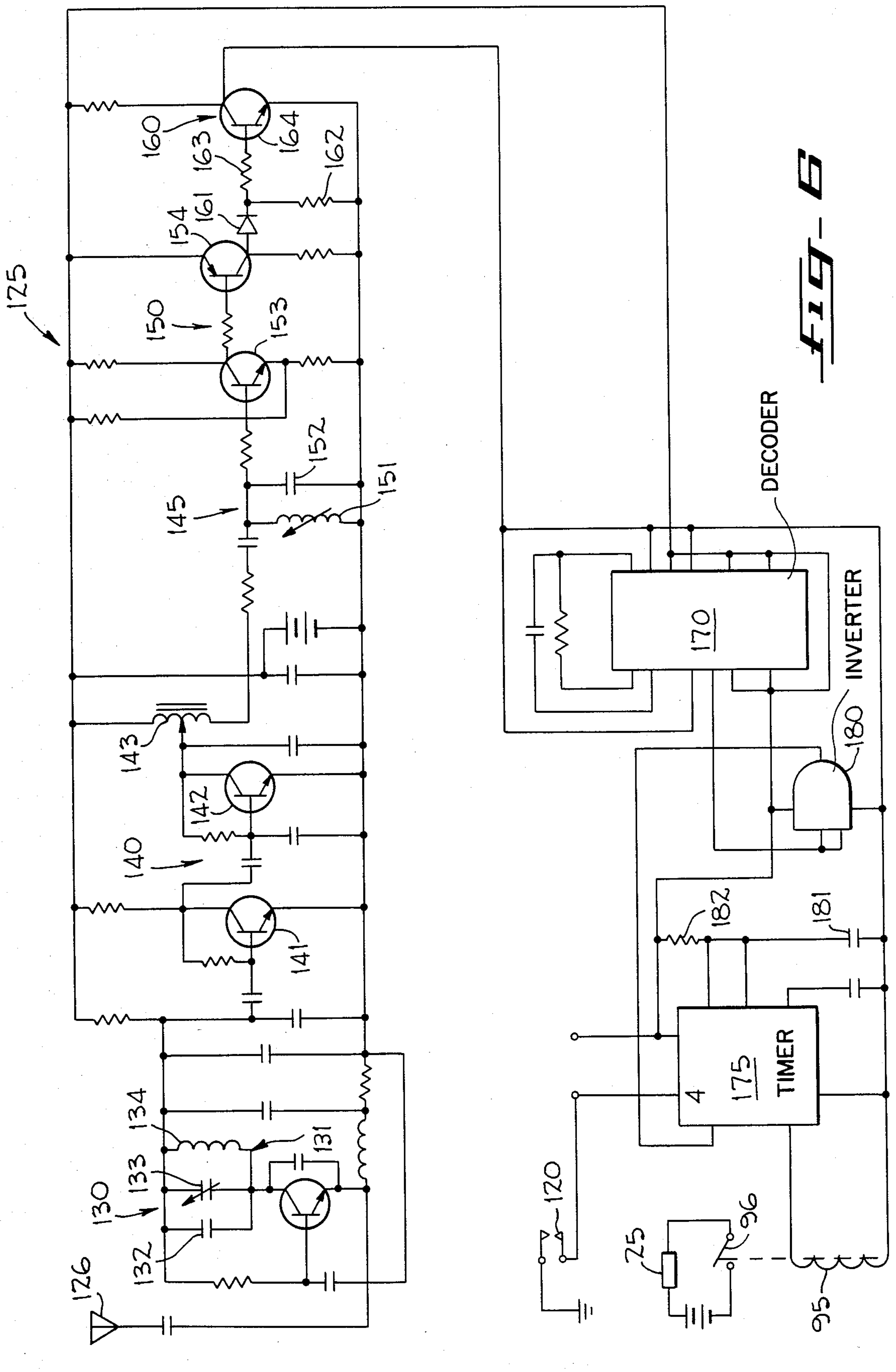
FIG. 6 is a schematic diagram of a modification of the receiver shown in FIG. 3.

Illustrated in FIG. 6 is a receiver 125, which is a modification of the receiver 20 shown in FIG. 3. The receiver 125 comprises an antenna 126 for receiving a tone coded, frequency modulated signal transmitted from the transmitter 15. The antenna 126 feeds a tone coded, frequency modulated signal to a suitable super regenerative mixer tuning circuit 130 for selecting a tone coded, frequency modulated signal from the range of frequency modulated signals, such as 80 $MH_z$ to 120 $MH_z$. A resonant output circuit 131 for passing a selected tone coded intermediate frequency signal includes a capacitor 132, a variable capacitor 133 and an inductor 134.

Connected to the output of the mixer tuning circuit 130 is a detector circuit 140, which includes transistors 141 and 142 and a center tapped audio transformer 143, that applies a tone coded audio signal through the transformer 143 to a band pass filter 145. In the preferred embodiment, the band pass filter 145 passes a tone coded 10 $KH_z$ audio signal. The band pass filter 145 includes a variable inductor 151 and a capacitor 152. The band pass filter 145 improves the signal-to-noise performance of the receiver 125.

A level detector 150, which includes transistors 153 and 154, is connected to the output of the band pass filter 145. The level detector passes only tone coded audio signals that exceed a preselected magnitude, such as 0.5 volts. In this manner, low level input noise is rejected to inhibit a false operation. A demodulating circuit 160, which includes rectifier 161, resistor 162, resistor 163 and transistor 164 removes the 10 $KH_z$ signal from the tone coded audio signal. The tone coded signal is applied to a suitable decoder 170, such as an ED-9 manufactured by Supertex Incorporated of Sunnyvale, Calif. Should the decoder 170 detect the correct code, a logic 1 signal is applied to a suitable timer 175 through an inverter circuit 180. The logic 1 signal triggers or activates the timer 175. The timer 175 may be an LM555. In the preferred embodiment, a capacitor 181 and a resistor 182 form an R-C time network to reset the timer 175 automatically in fifty-five seconds. The reset terminal 4 of the timer 175 can be grounded to reset the timer 175 within fifty-five seconds through the contacts 120 during a start-up and shut-down cycle of the ignition circuit 103 in a manner previously described.

When the timer 175 is activated by the application of a pulse from the decoder 170, the relay 95 is energized to close contacts 96. This action operates the vehicles device 25, such as a horn, to produce an alarm condition. The resetting of the timer 175 deactivates the timer 175 to deenergize the relay 95 for reopening the contacts 96. As a consequence thereof, the vehicle device 25 is deactivated.

I claim:

1. A wireless alarm system comprising:

(a) a portable radio frequency transmitter for transmitting a coded signal;

(b) a plurality of radio frequency receivers for receiving said coded signal, each of said radio frequency receivers comprising:

(1) first means for detecting said coded signals, and (2) second means activated in response to the detection of said coded signals; and (c) a plurality of vehicle means activated respectively in response to a plurality of said second means' being activated respectively for indicating an alarm condition.

2. A wireless alarm system comprising:

(a) a portable radio frequency transmitter for transmitting a coded signal, said transmitter including an encoder for transmitting a tone coded signal;

(b) a plurality of radio frequency receivers for receiving said coded signals, each of said radio frequency receivers comprising:

(1) first means for detecting said coded signal, and (2) second means activated in response to the detection of said coded signal, said second means including a decoder for detecting said coded signal; and (c) a plurality of vehicle means activated respectively in response to a plurality of said second means' being activated respectively for indicating an alarm condition.

3. A wireless alarm system comprising:

(a) a portable radio frequency transmitter for transmitting a coded signal;

(b) a radio frequency receiver for receiving said coded signal, said radio frequency receiver comprising:

(1) first means for detecting said coded signal, and (2) second means activated in response to the detection of said coded signal;

(c) vehicle means activated in response to said second means being activated for indicating an alarm condition;

(d) said second means including a timer activated in response to the detection of said coded signal for operating said vehicle means to indicate an alarm condition, said timer including reset means to restore said timer to its initial deactivated state; and (e) a vehicle including an ignition circuit, and means in said ignition circuit operative during the start-up and shut-down cycle of said ignition circuit for operating said reset means to restore said timer to its initial deactivated state.

4. A wireless alarm system as claimed in claim 3 wherein said means in said ignition circuit for operating said reset means includes a starter coil, and said reset means includes contacts opened and closed through the energization and deenergization of said coil.

5. A wireless alarm system as claimed in claim 3 wherein said timer includes automatic reset means to restore said timer to its initial deactivated state upon the expiration of a preselected period of time.

* * * * *